United States Patent [19]

Harvey

[11] Patent Number: 4,958,149

[45] Date of Patent: Sep. 18, 1990

[54] DISPLAY PANEL

[75] Inventor: Edgar L. Harvey, Jamesburg, N.J.

[73] Assignee: Telegenix, Inc., Cherry Hill, N.J.

[21] Appl. No.: 799,822

[22] Filed: Nov. 20, 1985

[51] Int. Cl.[5] .......... G09B 3/14

[52] U.S. Cl. .......... 340/715; 340/758; 340/775

[58] Field of Search .......... 340/715, 758, 759, 775

[56] References Cited

U.S. PATENT DOCUMENTS

| | | | |
|---|---|---|---|
| 3,743,880 | 7/1973 | Demarest | 313/316 |
| 3,938,140 | 2/1976 | Garcia et al. | 340/715 |
| 4,086,514 | 4/1978 | Havel | 313/500 |
| 4,179,637 | 12/1979 | Santora | 313/316 |
| 4,301,450 | 11/1981 | Smoliar | 340/715 |
| 4,311,993 | 1/1982 | Strobel | 340/715 |
| 4,488,149 | 12/1984 | Givens, Jr. | 340/715 |

*Primary Examiner*—Alvin E. Oberley

*Attorney, Agent, or Firm*—Robert A. Green

[57] ABSTRACT

A display panel includes a group of cathode segments, each segment comprising two cathode bars adapted to glow simultaneously to produce a single segment and circuits for coupling energizing signals to each bar of a segment separately and simultaneously so that if one bar does not light, the other will and proper display will be achieved. The panel also includes anode electrodes.

14 Claims, 5 Drawing Sheets

DISPLAY PANEL

BACKGROUND OF THE INVENTION

Gas-filled cold cathode display devices have been in use for many years. Most of these devices are relatively small in size, while at the same time, there has been a need for either a single panel of wall size or a large individual panel which can be used as an element in a wall size display. Attempts have been made to build individual panels to display large characters using individual segments over one inch in length and perhaps one-quarter inch or more in width. However, cathodes of this size and area are difficult to turn on uniformly and over their entire lengths.

The present invention solves this problem by providing display panels using multiple stroke cathode segments, each of which is of small area or width and can be turned on easily over its entire width. In addition, separate power supplies or signal sources are connected to each stroke of a cathode segment so that if one segment of a stroke does not light for some reason, the other segment will usually light. It would be highly unlikely for both segments of a stroke not to light.

DESCRIPTION OF THE INVENTION

A display panel 10 embodying the invention includes a gas filled envelope made up of a glass base plate 20 and a glass face plate 30 sealed together hemmetically along their aligned peripheries to form an envelope.

The panel 10 is made up of two assemblies, one formed on the base plate and the other formed on the face plate. The base plate assembly includes a plurality of groups of cathodes, each group being operable as a character display position. An anode arrangement is provided on the inner surface of the face plate overlying each group of cathodes.

Figure 3:
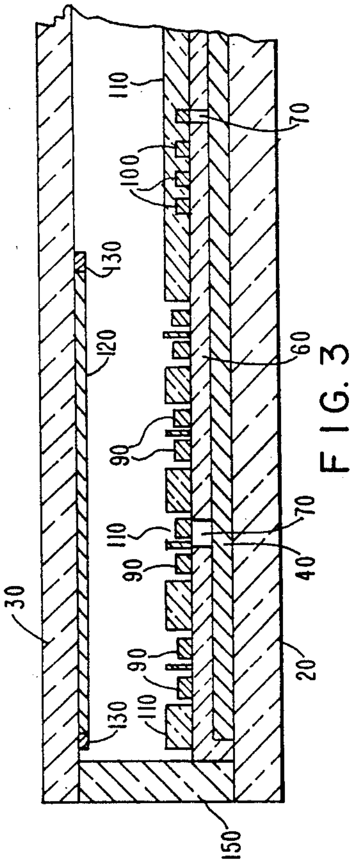
FIG. 3 is a sectional view of a portion of the panel of FIG. 1.
Figure 2:
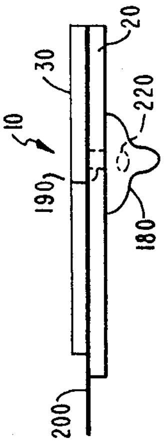
FIG. 2 is a side elevational view of the panel of FIG. 1.

A specific panel structure and method of manufacture are as follows. First referring to FIG. 3, an array of parallel conductor runs 40 is screened on the top surface 21 of the base plate 20 and an array of contact pads 50 as formed along the lower edge 24 of the base plate. The runs 40 and pads 50 are formed, for example by a screening process with any suitable conductive material including silver or nickel or some other metal as is well known in the art.

Next, a black glass insulating layer 60 is formed over the runs 40 with openings or vias 70, at selected locations, to which screened cathode glow electrodes and other conductors are to be connected. This is illustrated schematically in FIG. 5 which shows a few runs 40 and vias 70.

Figure 5:
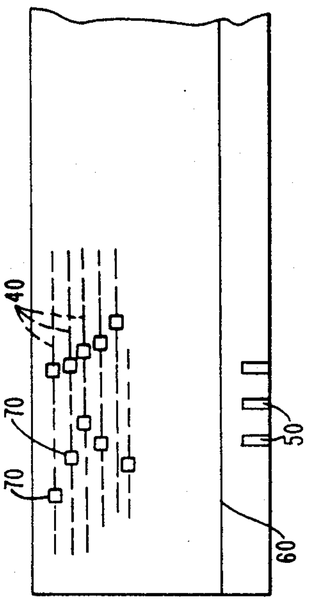
FIG. 5 is a plan view of the panel portion of FIG. 4 at a later stage in its manufacture.
Figure 4:
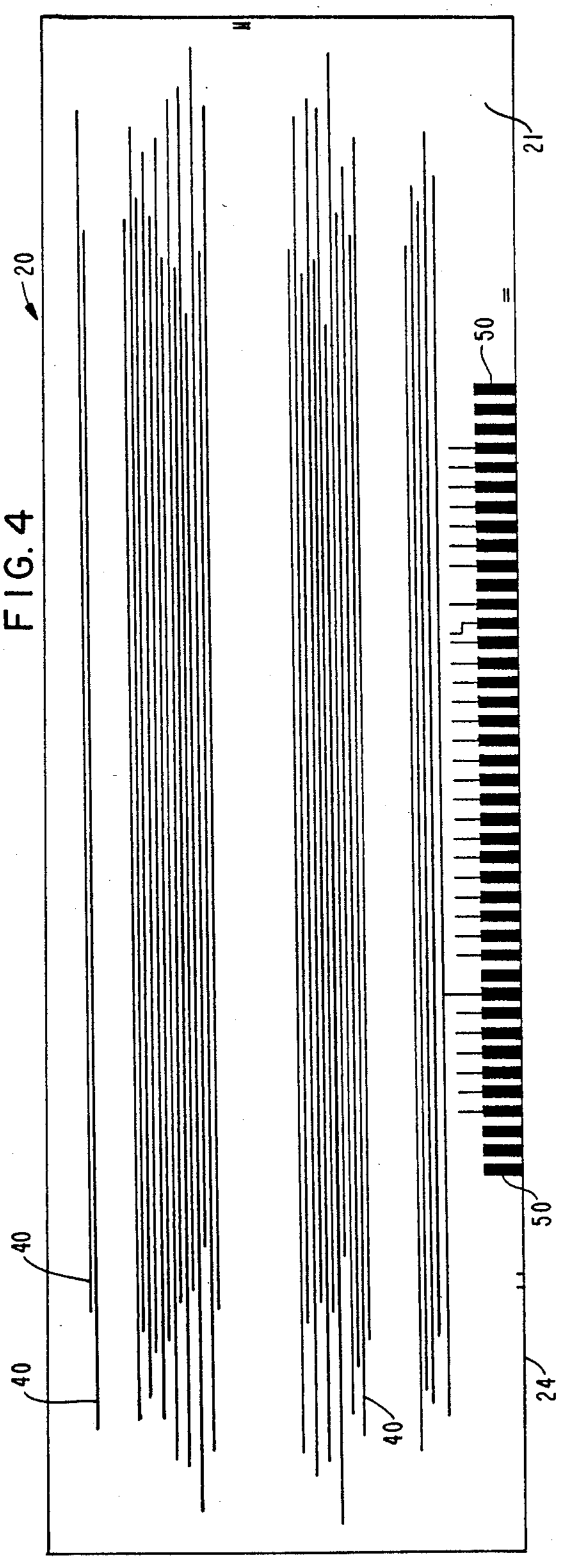
FIG. 4 is a plan view of the panel of FIG. 1 at one stage in its manufacture.

Next, groups of cathode electrodes for each character position 80 are formed on the base plate (FIG. 5). The panel 10 is a segment-type panel. That is, each character position 80 is made up of groups of cathode segments 82 which can be energized in different combinations to display different characters. In panel 10, as shown, each character position 80 includes an array of cathode segments 82 sufficient in number and location to permit the panel to be used for the display of alphanumeric characters. According to the invention, in each group of cathodes, each cathode segment 82 comprises two similarly shaped cathode bars 90 positioned sufficiently close to each other so that when the two bars 90 of a segment are energized, their glow blends to produce a wide character. All of the cathodes bars 90 are formed by a screening operation with a conductive material including nickel, silver or some other suitable metal. Nickel is commonly used.

At the same time that the cathode segments 90 are formed, conductive runs 100 are also formed on layer 60 and connected through vias 70 (some are shown in FIG. 5) to the underlying conductive runs 40 which are thus connected to contact pads 50 whereby external electrical connection can be made to the runs and thus to their cathodes.

Next, another black insulating layer 110 (FIG. 3) is screened on the base plate covering everything except the cathode bars which are outlined by this layer.

Figure 8:
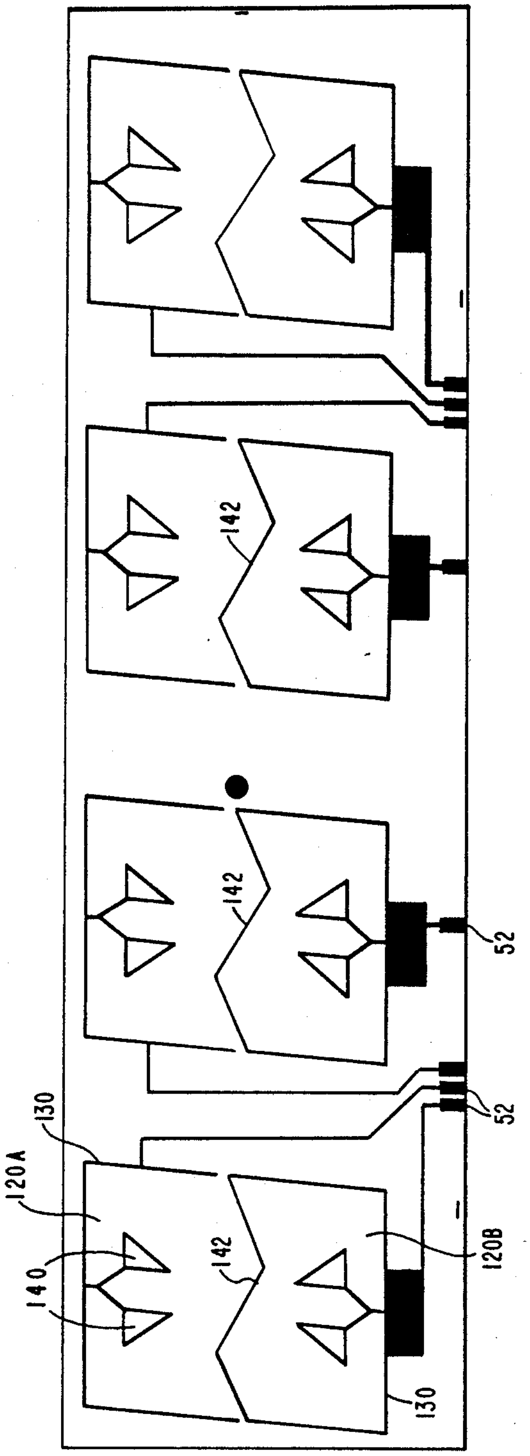
FIG. 8 is a plan view of the inside surface of the face plate showing the anodes carried thereby.

The anodes 120 for the character positions 80 and the groups of cathode segments in panel 10 are formed on the inner bottom surface of the face plate 30. The anodes are formed in two parts 120A and 120B (FIG. 8) which effectively split the group of cathode segments 82 in two groups, an upper group and a lower group, The anodes are of transparent conductive material such as tin oxide and they are outlined with a conductor 130 such as silver to impart strength and greater conductivity. In addition, small triangles 140 of the conductive reinforcing material are formed internally to further increase the conductivity of the anodes. The anode portions are individually connected to edge contact tabs 52 on the face plate by means of conductive runs under the insulating layer 110.

For convenience, the division between the two anode portions is represented by solid line 142.

In assembling the panel 10 a thin, narrow layer of cement 150 (FIG. 1) such as pyroceram, is placed along the entire edge of the base plate with narrow transverse extensions or arms 160 extending inwardly from the upper and lower edges of the panel toward each other between each group of cathodes or character positions 80. The cement arms 160 do not extend fully across the panel but are sufficiently long to assist in sealing the base plate together. A similar array of cementareas is formed on the face plate properly located so that when the base plate and face plate are coupled together for sealing, the cement on the face plate overlie each other exactly and they seal together hermetically with the two plates in proper alignement. The auxiliary cement extensions 160 and dots 170 prevent audible vibrations of the panel, as can occur in operation of some display panels.

In providing the auxiliary extensions of cement 160 and the dots of cement 170 to prevent audible vibrations, they are positioned so that each unit area of the panel, of about one inch by about one inch is provided at its corners with support and seals. In other terms, no area greater than, say 1½ inches goes without support at its corners.

It is to be understood that although all of the processing steps are not described in detail, various bake-out and other stepsare carried out as required and as well known to those skilled in the art.

After the base plate and face plate have been hermetically sealed together by a baking procedure, the panel is filled with an ionizable gas through a tubulation 180 secured to the outer surface of the base plate and communicating with the inside of the panel through a hole 190 in the base plate. The hole 180 is not obstructed by any of the materials placed on the base plate. The gas filling mat be argon, neon, xenon or the like, singly or in combination, at a suitable pressure in the range of about 100 to about 400 Torr. Mercury vapor is also introduced into the panel in any suitable manner, usually from a capsule 220 held in the tubulation.

Figure 1:
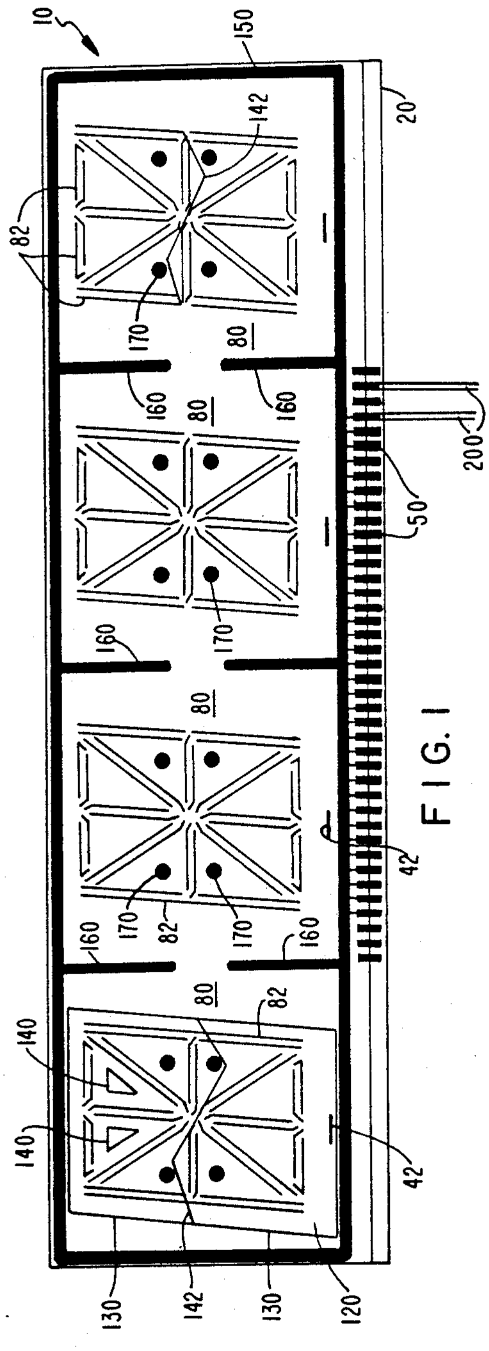
FIG. 1 is a plan view of a display panel embodying the invention.

Contact pins 200, some of which are shown in FIG. 1, are cemented to the pads 50, and if desired they are further secured in place by means of a cement bead which extends along the edge of the base plate over the pads. In addition, if desired, the inner ends of the contact pins may be positioned in a space between the base plate and face plate, however, this arrangement is not shown in the drawings.

Figure 6:
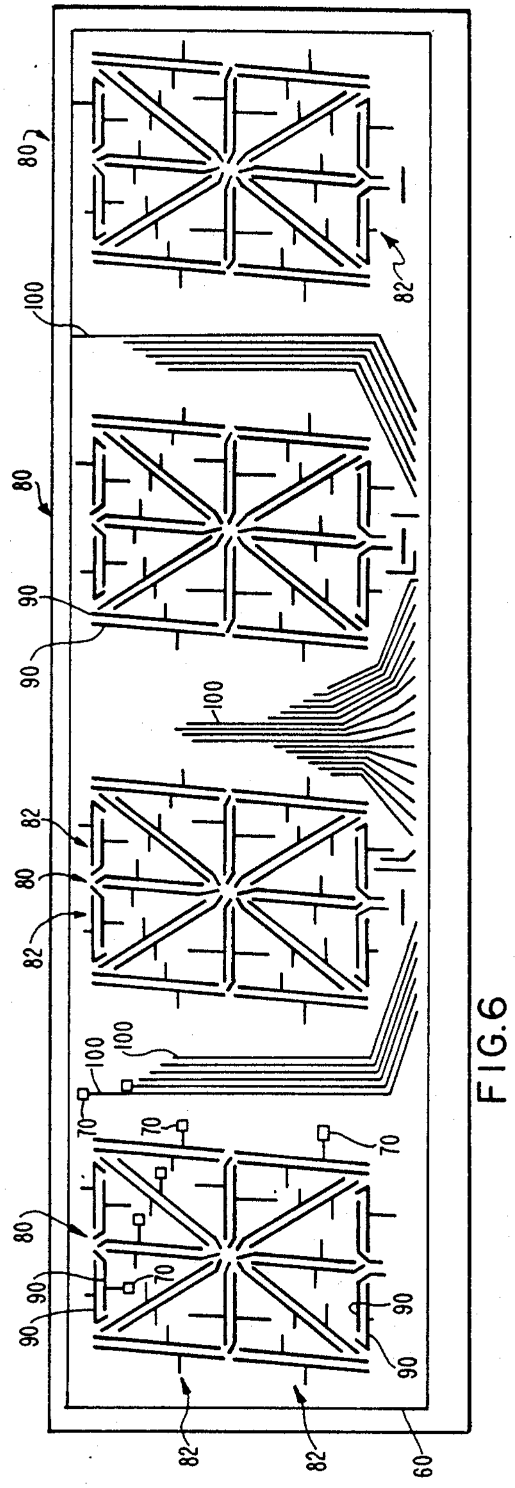
FIG. 6 is a plan view of the panel portion of FIG. 5 at a still later stage in its manufacture.
Figure 7:
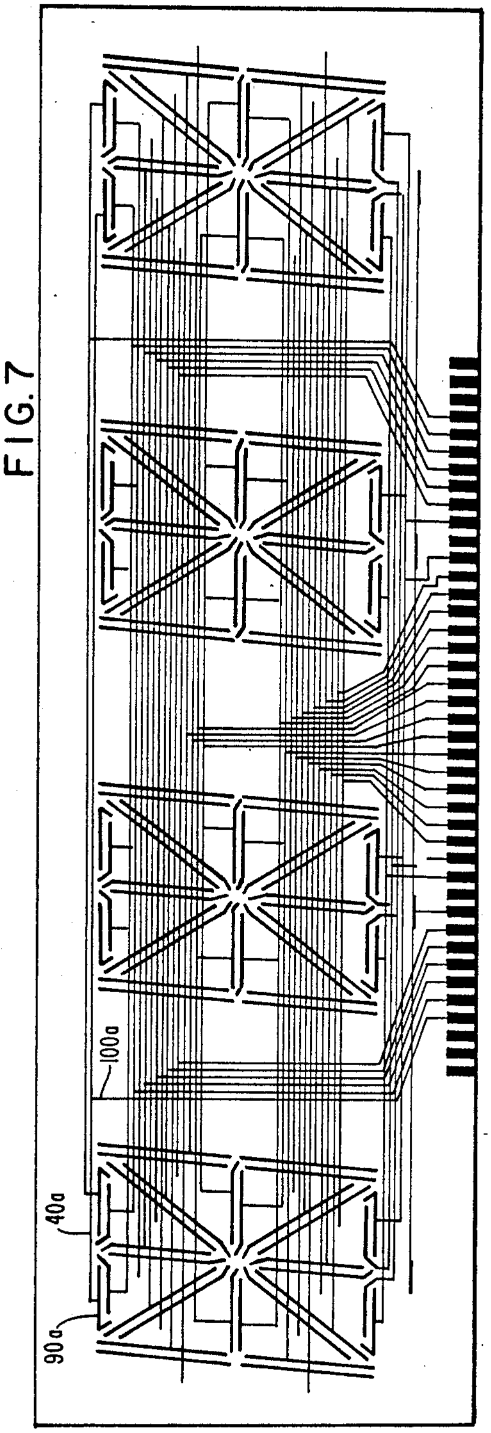
FIG. 7 is a plan view of the panel portion of FIG. 6 at a later stage in its manufacture.

In the panel 10, as shown in FIG. 6. all of the same cathode bars in the various groups of segments are connected to the same conductive runs 40 and 100 and pad 50 so that energizing signals can be connected to all of the same bars at the same time when the panel is operated in multiplex fashion. All of the anode portions 120A and 120B are separately connected to their own edge pads 52 and contact pins 200 are also secured to these contact pads 52.

The panel 10 also includes a keep-alive cathode for each character position and these are formed from a single horizontal run 40 which is covered with the insulating layers but has small portions 42 exposed at each character position (FIG. 1).

With the cathode bars 90 connected as described above, the panel 10 can be operated in a multiplex mode wherein as selected cathode bars in the groups are energized, only the bars in the group which has its anodes energized will display glow and a character. This operation is carried out from group to group and cyclically throughout the panel at such a rate that an apparently stationary but changeable message is displayed.

According to the invention, in operation of the panel 10, as the panel is scanned at each character position, the two anodes have generally positive potential connected to them and selected cathode segments to be displayed have generally negative potential applied to them so that the potential difference between a cathode segment and its anode is sufficient to cause the segment to glow.

Figure 9:
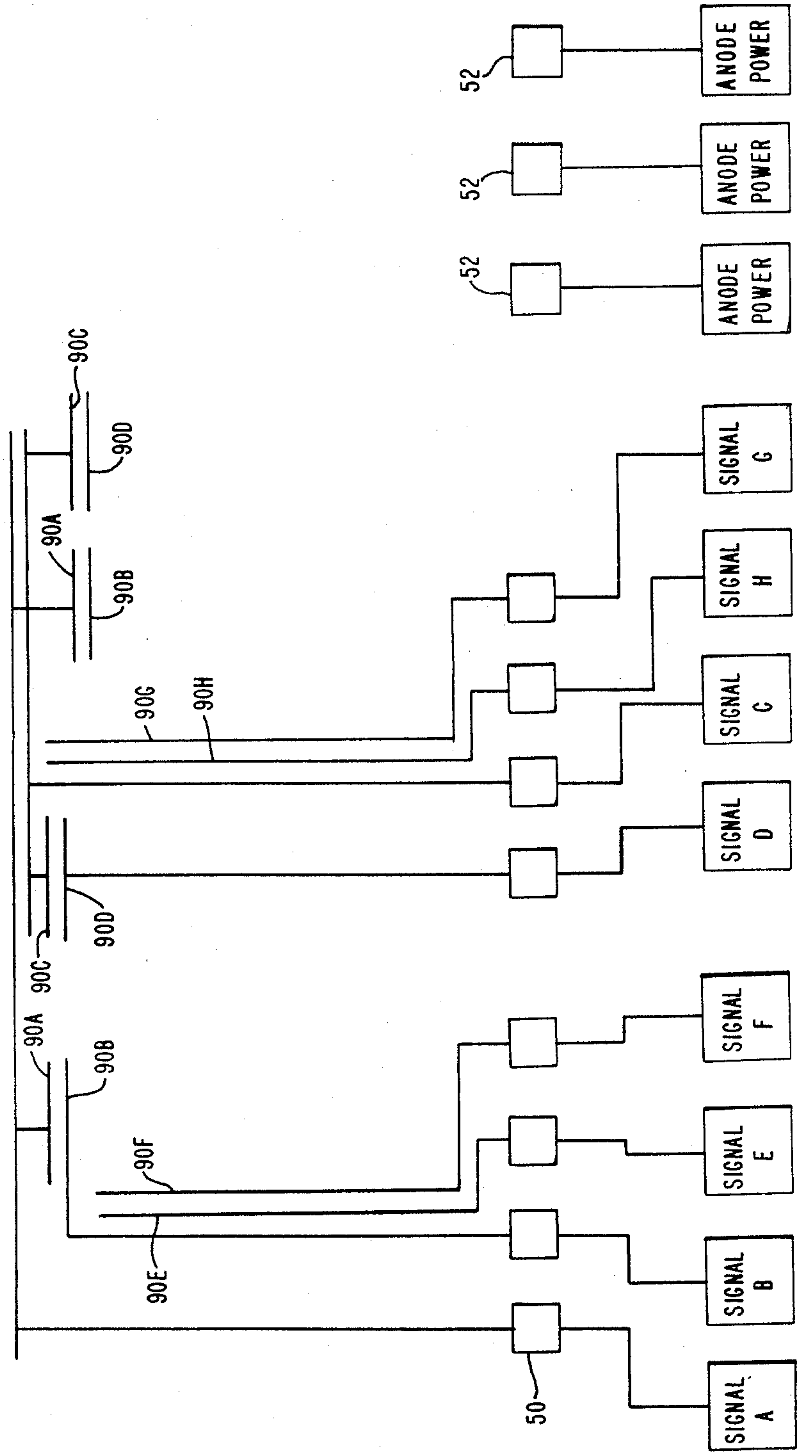
FIG. 9 is a schematic representation of a portion of the panel of FIG. 1 and a circuit for operating the electrodes thereof.

Further in operation of panel 10, and referring to FIG. 9, if in character position, a cathode segment made up of two bars 90A and 90B is to be energized and caused to glow, the system applies the same turn-on signal from separate sources, to both bars 90A and 90B simultaneously. Similarly, if the segment made up of bars 90C and 90D is to be energized to glow, then the same energizing signal is applied to these two bars simultaneously from separate sources. This principle applies to each segment to be turned on in each character position as the panel is multiplexed. FIG. 9 represents the principle with separate sources connected to each cathode bar and separate anode power sources connected to each anode pair.

With this arrangement, if by chance, one cathode bar of a pair is not turned on, for whatever reason, the other bar will normally be turned on and no false display will occur. For example, it is possible that a failure of cathodes might convert a desired "8" into a false "3". Such an incorrect display could be disastrous under certain circumstances. Another advantage of the invention is that, in each pair of cathode bars, as an example, cathode bars which are 35 mils wide and spaced apart by 35 mils, present a stroke width of about 105 mils in operation with economical power expenditure. It would be economically and functionally "impossible" to attempt to obtain such a stroke width with a single cathode.

Another advantage of the invention is the use of the split anodes which imparts a power advantage in operation of the panel. It is noted that in the multiplex mode of operation, both anode portions at each character position are energized at the same time.

It is to be noted that although the term "cathode bar" is used herein, it is not necessary that, in each cathode segment, the two "bars" be linear in shape. Any similar shape will satisfy the principles of the invention.

What is claimed is:

1. A display panel comprising an envelope made up of a glass face plate and a glass base plate sealed together hermetically to form an envelope which is filled with an ionizable gas for supporting cathode glow, a group of cathode segments disposed adjacent to said base plate and adapted to be energized in different combinations to display different characters, each cathode segment including two cathode members disposed close to and parallel to each other and denoted as first and second bars, means electrically connecting to a contact pad each cathode bar whereby identical energizing signal sources can be connected to the two cathode bars of each cathode segment so that both bars of a cathode segment can be energized simultaneously to produce a glow along each bar and the glow of one bar blends with the glow of the other bar to produce, in effect, a doubly wide area of cathode glow; or if a first cathode bar of a segment does not turn on and glow, the second cathode bar of the same segment will turn on and glow and provide a correct display, and anode means disposed in operative relation with said group of cathode segments.

2. A display panel comprising an envelope made of a glass base plate and a transparent glass face plate sealed together hermetically to form an envelope which is filled with an ionizable gas for supporting cathode glow, a group of cathode segments disposed adjacent to said base plate and adapted to be energized in different combinations to display different characters, each cathode segment including two cathode bars disposed close to and parallel to each other and denoted as first and second bars, means electrically connecting to a contact pad each cathode bar whereby identical energizing signal sources can be connected to the two cathode bars of each cathode segment so that if a first cathode bar of a segment does not turn on and glow, the second cathode bar of the same segment will turn on and glow and provide a correct display, and anode means disposed in operative relation with said group of cathode segments, the two members of each cathode segment being positioned sufficiently close to each other so that the glow generated by one blends with the glow produced by the other so that the eye sees a single glowing segment.

3. The panel defined in claim 2 wherein said anode means includes a first portion lying in operative relation with one group of cathode segments and a second portion lying in operative relation with a second group of cathode segments.

4. The panel defined in claim 2 wherein said anode means includes a first portion lying in operative relation with one group of said cathode segments and a second portion lying in operative relation with the remainder of said cathode segments.

5. A display panel comprising an envelope made up of a glass base plate and a transparent glass face plate sealed together hermetically to form an envelope which is filled with an ionizable gas for supporting cathode glow, a plurality of groups of cathode segments disposed adjacent to said base plate, each group defining a character position, each group of cathode segments including a plurality of cathode segments which are adapted to be energized in different combinations to display different characters, each cathode segment in each group comprising a pair of cathode bars disposed adjacent to each other so that when two cathode bars of a pair glow, the glow on one blends with the glow of the other, each corresponding cathode bar in each group of cathode segments being connected to a common conductor whereby the same operating signal can be connected to all corresponding cathode bars at the same time, the pairs of cathode bars which are to be energized and caused to glow at any instant being adapted to receive energizing signals at the same time so that if one cathode bar of a segment does not turn on and glow, the second cathode bar of the same segment will turn on and glow and provide a correct display, and anode means displosed in operative relation with said group of cathode segments.

6. The panel defined in claim 5 and including means securing said base plate and face plate together so that, in operation, audible vibrations are not generated, said means comprising areas of cement disposed along the length of the panel so that each unit area of the panel has cement securing the base plate and face plate together at all four corners of the unit areas.

7. The panel defined in claim 6 wherein said means includes linear portions of cement which extend toward each other from the upper and lower portions of the peripheral seal between the base plate and face plate.

8. The panel defined in claim 7 and further including dot-like areas of cement disposed within each character position.

9. The panel defined in claim 5 and including an array of contact pads disposed along the lower edge of said panel and to which all of the panel electrodes are connected.

10. The panel defined in claim 9 and including elongated contact pins secured to said contact pads.

11. A display panel comprising an envelope made up of a glass base plate and a glass face plate hermetically sealed together to form a chamber which is filled with an ionizable gas capable of supporting cathode glow, a group of cathode segments disposed adjacent to said base plate and adapted to be energized in different combinations to display different characters, each cathode segment including a plurality of cathode members disposed adjacent to each other and adapted to operate individually or as a unit of more than one, means electrically connecting together the cathode members of each cathode segment so that when electrical signals are applied to a cathode segment, they are applied simultaneously to all of the cathode members of the segment whereby, if no defects are present in a cathode segment, all of the cathode members of a cathode segment glow and the glows of the cathode members blend with each other to provide an area of glow larger than that produced by any one member and, if a defect is present in a cathode segment which would prevent all but at least one cathode member from glowing, then said at least one cathode member will glow and its segment will provide glow and a correct overall character representation is made by all of the cathode segments which glow.

12. The panel defined in claim 11 wherein, in each cathode segment, the cathode members are substantially identical in shape.

13. The panel defined in claim 11, wherein, in each cathode segment, the cathode members are substantially identical in size and shape.

14. The panel defined in claim 11 wherein, in each cathode segment, the cathode members are linear elements which are disposed adjacent to and parallel to each other.

* * * * *